US012579762B2

(12) United States Patent
Akiva

(10) Patent No.: US 12,579,762 B2
(45) Date of Patent: Mar. 17, 2026

(54) OVERLAY ADAPTATION FOR VISUAL DISCRIMINATION

(71) Applicant: Harman International Industries, Incorporated, Stamford, CT (US)

(72) Inventor: Ohad Akiva, Hod-HaSharon (IL)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 136 days.

(21) Appl. No.: 18/293,314

(22) PCT Filed: Jul. 28, 2021

(86) PCT No.: PCT/IB2021/056853
§ 371 (c)(1),
(2) Date: Jan. 29, 2024

(87) PCT Pub. No.: WO2023/007220
PCT Pub. Date: Feb. 2, 2023

(65) Prior Publication Data
US 2024/0338901 A1 Oct. 10, 2024

(51) Int. Cl.
*G06T 19/00* (2011.01)
*B60K 35/234* (2024.01)
*G02B 27/01* (2006.01)

(52) U.S. Cl.
CPC .......... *G06T 19/006* (2013.01); *B60K 35/234* (2024.01); *G02B 27/01* (2013.01)

(58) Field of Classification Search
CPC .... G06T 19/006; B60K 35/234; G02B 27/01; G09G 5/02; G09G 2380/10; G09G 3/001
See application file for complete search history.

(56) References Cited

U.S. PATENT DOCUMENTS

| 2011/0201925 A1* | 8/2011 | Lautenschlager ..... G06T 7/0012 |
| | | 600/425 |
| 2014/0253579 A1 | 9/2014 | Babaguchi |
| 2017/0343809 A1 | 11/2017 | Benesh et al. |
| 2019/0250402 A1 | 8/2019 | Chen |
| 2020/0183157 A1* | 6/2020 | Suzuki ............... G02B 27/0179 |

FOREIGN PATENT DOCUMENTS

JP          2019080167 A  *  5/2019  ............... G09G 5/02

OTHER PUBLICATIONS

English translation of JP 2019080167 A (Year: 2019).*
ISA European Patent Office, International Search Report and Written Opinion Issued in Application No. PCT/IB2021/056853, Apr. 21, 2022, WIPO, 20 pages.

* cited by examiner

*Primary Examiner* — Grace Q Li
(74) *Attorney, Agent, or Firm* — McCoy Russell LLP

(57) ABSTRACT

There is provided, a computer implemented method of dynamic adaptation of an augmented reality presentation, comprising: monitoring an augmented reality presentation comprising frames of a video captured by a camera disposed on a moving object, and an icon overlay on the frames, detecting a visual similarity between pixels of the icon and pixels of a specific frame at least one of: behind the icon and in near proximity to the icon, and in response to the detected visual similarity, adapting the icon for visual discrimination between the icon and pixels of the specific frame at least one of: behind the icon and in near proximity to the icon.

15 Claims, 5 Drawing Sheets

100

Monitor augmented reality presentation
202

Detect visual similarity between icon and
background of the AR presentation
204

Iterate
208

Adapt icon for visual discrimination with
background of the AR presentation
206

300

304

302

304

310

312

314

316

OVERLAY ADAPTATION FOR VISUAL DISCRIMINATION

CROSS-REFERENCE TO RELATED APPLICATIONS

The present application is a U.S. National Phase of International Application No. PCT/IB2021/056853, entitled "OVERLAY ADAPTATION FOR VISUAL DISCRIMINATION", and filed on Jul. 28, 2021. The entire contents of the above-listed application are hereby incorporated by reference for all purposes.

BACKGROUND

The present disclosure, in some embodiments thereof, relates to augmented reality and, more specifically, but not exclusively, to systems and methods for adjusting an overlay of an augmented reality presentation.

Augmented reality provides an interactive user experience based on the real world, where real world objects are enhanced by computer generated presentations, for example, an overlay of data, such as tags, that provide a user with a name of different objects seen in the real world.

SUMMARY

According to a first aspect, a computer implemented method of dynamic adaptation of an augmented reality presentation, comprises: monitoring an augmented reality presentation comprising frames of a video captured by a camera disposed on a moving object, and an icon overlay on the frames, detecting a visual similarity between pixels of the icon and pixels of a specific frame at least one of: behind the icon and in near proximity to the icon, and in response to the detected visual similarity, adapting the icon for visual discrimination between the icon and pixels of the specific frame at least one of: behind the icon and in near proximity to the icon.

According to a second aspect, a computer implemented method of dynamic adaptation of an augmented reality presentation, comprises: monitoring an augmented reality presentation presented on a heads up display (HUD), and an icon overlay on the HUD, detecting a visual similarity between pixels of the icon and a background of real world environment and/or objects located at least one of: behind the icon and in near proximity to the icon, and in response to the detected visual similarity, adapting the icon for visual discrimination between the icon and the background of real world environment and/or objects located at least one of: behind the icon and in near proximity to the icon.

According to a third aspect, a computer implemented method of dynamic adaptation of an augmented reality presentation, comprises: monitoring an augmented reality presentation comprising an icon overlay, detecting a visual similarity between pixels of the icon and a background of the augmented reality presentation located at least one of: behind the icon and in near proximity to the icon, and in response to the detected visual similarity, adapting the icon for visual discrimination between the icon and the background of the augmented reality presentation located at least one of: behind the icon and in near proximity to the icon.

In a further implementation form of the first, second, and third aspects, the moving object comprises a vehicle, and the icon is generated by a navigation system.

In a further implementation form of the first, second, and third aspects, the icon is selected from a group consisting of:

an arrow indicating where to direct the vehicle, a tag indicating a possible hazard, a tag indicating police, and a tag indicating a stop location of interest.

In a further implementation form of the first, second, and third aspects, the moving object comprises a vehicle, and the icon is generated by an advanced driver assistance system (ADAS).

In a further implementation form of the first, second, and third aspects, the augmented reality presentation is presented on a head up display (HUD), wherein the icon is rendered as the overlay on the head up display relative to real world objects appearing in a scene behind the HUD, and the visual similarity is detected between pixels of the icon and real world regions of the environment and/or objects located at least one of: behind the icon and in near proximity to the icon.

In a further implementation form of the first, second, and third aspects, the adapting the icon comprises adapting a member selected from a group consisting of: color within the icon, intensity of pixels within the icon, border of the icon, intensity of pixels of the border of the icon, pattern within the icon, thickness of the border of the icon, and shape of the icon.

In a further implementation form of the first, second, and third aspects, the adapting the icon comprises moving the icon from a present location of visual similarity to another location on the augmented reality presentation of visual discrimination.

In a further implementation form of the first, second, and third aspects, further comprising: computing a statistical distance between pixel intensities of the pixels of the icon and pixels of the specific frame at least one of: behind the icon and in near proximity to the icon, and adapting the icon for visual discrimination when the statistical distance is above a threshold by adjusting intensity of pixels to above the threshold.

In a further implementation form of the first, second, and third aspects, further comprising: computing a statistical distance within a color space between color of the pixels of the icon and color of pixels of the specific frame at least one of: behind the icon and in near proximity to the icon, and adapting the icon for visual discrimination when the statistical distance is above a threshold by adjusting color of pixels of the icon to above the threshold.

In a further implementation form of the first, second, and third aspects, further comprising: computing a statistical distance within a multi-dimensional color-intensity space between a combination of intensity and color of the pixels of the icon and a combination of intensity and color of pixels of the specific frame at least one of: behind the icon and in near proximity to the icon, and adapting the icon for visual discrimination when the statistical distance is above a threshold by adjusting color of pixels of the icon to above the threshold.

In a further implementation form of the first, second, and third aspects, adapting comprise adapting color of pixels of the icon for visual discrimination according to a color blind profile of a user viewing the augmented reality presentation, wherein the visual similarity and visual discrimination are determined according to the color blind profile.

In a further implementation form of the first, second, and third aspects, further comprising iterating the monitoring, the detecting, and the adapting.

In a further implementation form of the first, second, and third aspects, pixels in near proximity to the icon comprise pixels extending out from a border of the icon in a dimension sized for visual discrimination between pixels in the dimension and pixels of the icon in view of pixels external to the dimension.

In a further implementation form of the first, second, and third aspects, further comprising selecting a location for the overlay of the icon on the specific frame, and selecting initial values for pixels of the icon for visual discrimination between the icon at the location and pixels of the specific frame at least one of: behind the icon at the location and in near proximity to the icon at the location.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
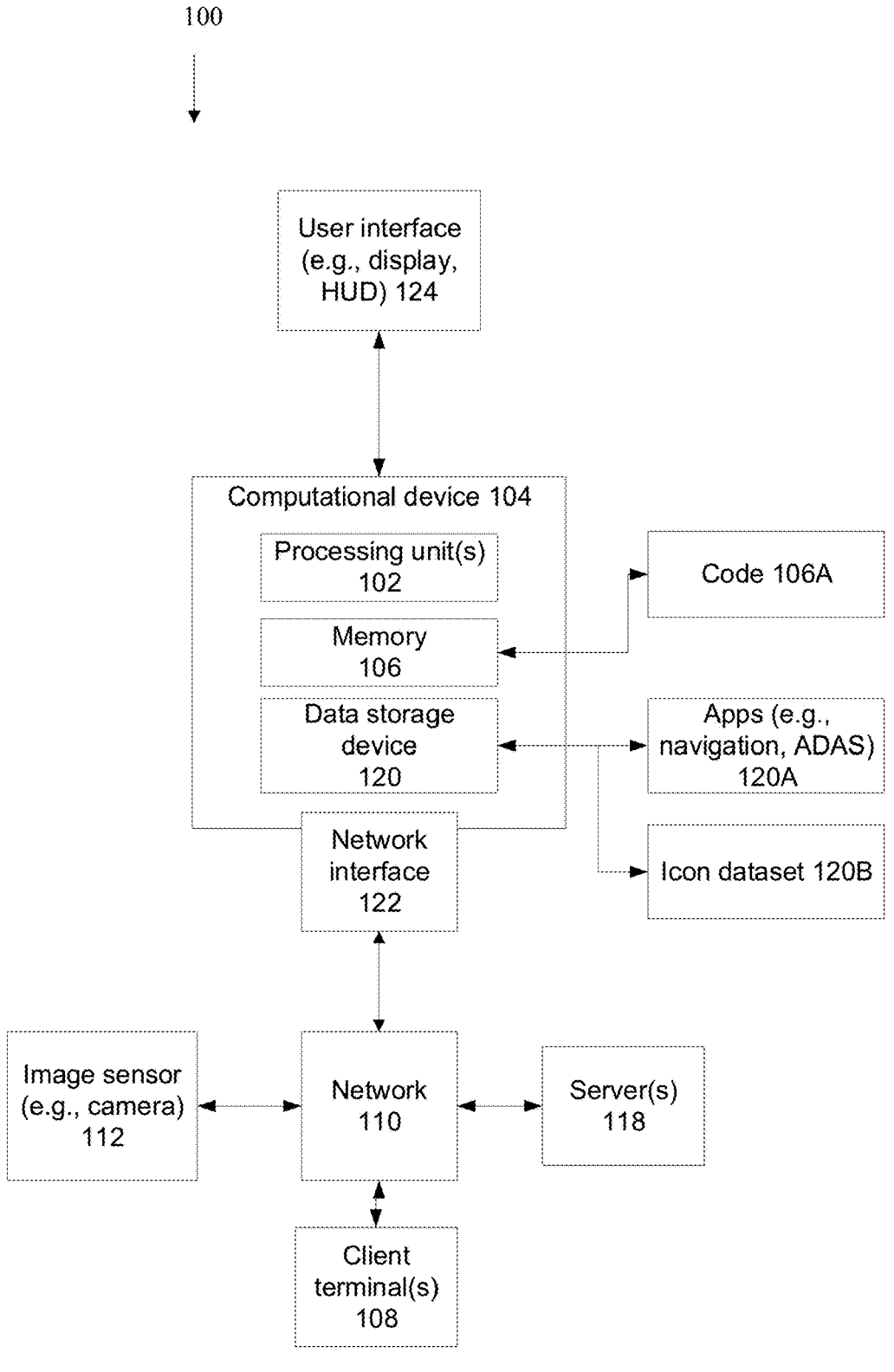
FIG. 1 is a block diagram of a system for dynamic adaptation of an augmented reality presentation for visual discrimination between an icon overlay of the AR presentation and background of the AR presentation, in accordance with some embodiments of the present disclosure.

The present disclosure, in some embodiments thereof, relates to augmented reality and, more specifically, but not exclusively, to systems and methods for adjusting an overlay of an augmented reality presentation.

An aspect of some embodiments of the present disclosure relates to systems, methods, an apparatus, and/or code instructions (e.g., stored on a memory and executable by one or more hardware processors) for dynamic adaptation of an icon overlay on an augmented reality (AR) presentation for visual discrimination between the icon and a background of the AR presentation located behind the icon and/or in near proximity to the icon. The icon may be, for example, an arrow generated by a navigation application indicating to the driver where to turn, and/or a hazard tag generated by an advanced driver assistance system (ADAS) warning the driver of an upcoming hazard. The background of the AR presentation may include frames of a video captured by a camera located on a moving object, for example, a car. In such implementation, the icon is rendered as an overlay on frames of the video, and the visual discrimination is between the icon and pixels of the image located behind the icon and/or in near proximity to the icon. Alternatively or additionally, the background of the AR presentation is a real world environment and/or object, for example, as viewed by the user (e.g., driver). In such implementation, the AR presentation may be presented on a heads up display (HUD), for example, a windshield of the car. The icon may be presented on the HUD (e.g., the video captured by the camera may be used for rendering the icon presented on the HUD relative to an object depicted in the video and in the real world). The visual discrimination is between the icon and real world background located behind the icon and/or in near proximity to the icon. . . . The AR presentation is monitored to detect a visual similarity between pixels of the icon and the background (e.g., pixels of a specific frame and/or real world environment and/or real world objects) behind the icon and/or in near proximity to the icon. For example, color and/or pattern and/or intensity of the icon is similar to the background (e.g., pixels of the frame, and/or real world environment and/or real world objects) that is behind the icon and/or in near proximity to the icon, making it difficult for the driver to identify the icon relative to the background, in particular, to quickly see the icon to enable a fast response by the driver. In response to the detected visual similarity, the icon is adapted for visual discrimination between the icon and the background (e.g., pixels of the specific frame and/or real world environment and/or real world objects) behind the icon and/or in near proximity to the icon. For example, color and/or pattern and/or intensity of the icon is adapted, to make it easy for the driver to quickly see the icon relative to the background of the frame, which enables the driver to react quickly.

At least some implementations of the systems, methods, apparatus, and/or code instructions described herein relate to presenting icons on an augmented reality presentation on a moving vehicle, for example, a car. Images used for generation of the augmented reality presentation, captured by a camera on the moving vehicle, depict a rapidly changing environment, for example, driving against the sun, driving in and out of tunnel, driving at night, driving in rain, driving in fog, color on building, light condition (different lamps, different colors), and different road structure. Icons may be dynamically created and/or dynamically adapted in response to the location of the vehicle and/or the environment depicted in the scene, for example, to indicate the driver where to turn, and/or to assist the driver in avoiding accidents by identifying hazards. The dynamically created and/or dynamically adapted icons are viewed by the driver of the vehicle together with the upcoming road, for example, on a heads up display through which the real world environment is seen, and/or on an image of the real world environment captured by a camera. At least some implementations of the systems, methods, apparatus, and/or code instructions described herein relate to designing icons to be quickly noticed by the driver.

At least some implementations of the systems, methods, apparatus, and/or code instructions described herein improve the technology of rendering overlays for an augmented reality presentation for a moving vehicle, for example, a car. The AR presentation may be, for example, icons overlayed on a HUD, and/or icons overlayed on images captured by a camera. Standard approaches for generation of augmented reality presentations are not designed for moving vehicles. Standard approaches are designed, for example, for single images such as captured by a smart phone and/or AR glasses, and/or for slowly changes scenes, such as a user walking while capturing images by the smart phone and/or AR glasses, in contrast to moving vehicles. As such, the standard approaches are designed for static environments and/or near-static (e.g., slowly changing) environments, in contrast to fast changing environments on moving vehicles. Moreover, the standard approaches are designed as "nice to have" enhancements that are not necessarily acted on by the user, in contrast to icons for moving vehicles which are commonly acted on by the user, for example, to navigate the car to a destination, and/or avoid a collision with a parked vehicle up ahead. As such, standard approaches created overlays for AR presentations are designed to be as immersive as possible, by rendering the overlay object to blend in with the environment depicted in the image so as not to disturb the attention of the user from the image, for example, by appearing as part of the environment.

At least some implementations of the systems, methods, apparatus, and/or code instructions described herein relate to and/or provide an improvement to the above mentioned technology, by adapting icons presented on the AR presentation for increased likelihood that the user will notice the overlay icons. At least some implementations of the systems, methods, apparatus, and/or code instructions described herein relate to adapting the pixels (e.g., shape, color, pattern, location) of the overlay icon for visual discrimination relative to pixels of the frame behind the icon and/or in near proximity to the icon. Icons that are visually similar to pixels of the frame behind the icon and/or in near proximity to the icon are adapted to create visual discrimination relative to pixels of the frame behind the icon and/or in near proximity to the icon. The adaptation of the icon for visual discrimination with the frame increases likelihood that the user (e.g., driver) will notice the icon, which increases likelihood the user will act upon the icon, for example, make a turn in response to an arrow directing the user to turn, and/or park the vehicle at a point of interest in respond to a tag of the point of interest. When the vehicle is moving quickly, fast visual observation of the icon enables the user to quickly act upon the icon. For example, in response to a hole in the road, a tag and/or arrow may appear indicating to the user to quickly maneuver the vehicle to avoid the hole.

At least some implementations of the systems, methods, apparatus, and/or code instructions described herein may also relate to creating AR presentations that are not significantly affected by changes in images obtained from the camera on the vehicle. The environment conditions and/or image sensor (e.g., camera) output might change from vehicle to vehicle, and/or even from drive to drive. The camera condition may affect the image. For example, each camera might behave differently, to some degree, so different images of a same/similar scene, for example, captured from a same/similar view and/or on two different camera (e.g., even if from the same type) might appear differently (from color perspective and/or intensity perspective) . . . . The change in output affects the frames obtained from the camera, which may cause the AR and icons to be less noticeable from the driver view. For example, an icon of one AR presentation might be visually discernable, while the same icon on another similar AR presentation might not be visually discernable At least some implementations of the systems, methods, apparatus, and/or code instructions described herein relate to adapting the icon according to pixels of current frames, which may enable maintaining high visibility of the icon (to the user, e.g., driver) with respect to different images of the AR presentation being affect by the environment, image sensor, vehicle, and/or drive.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
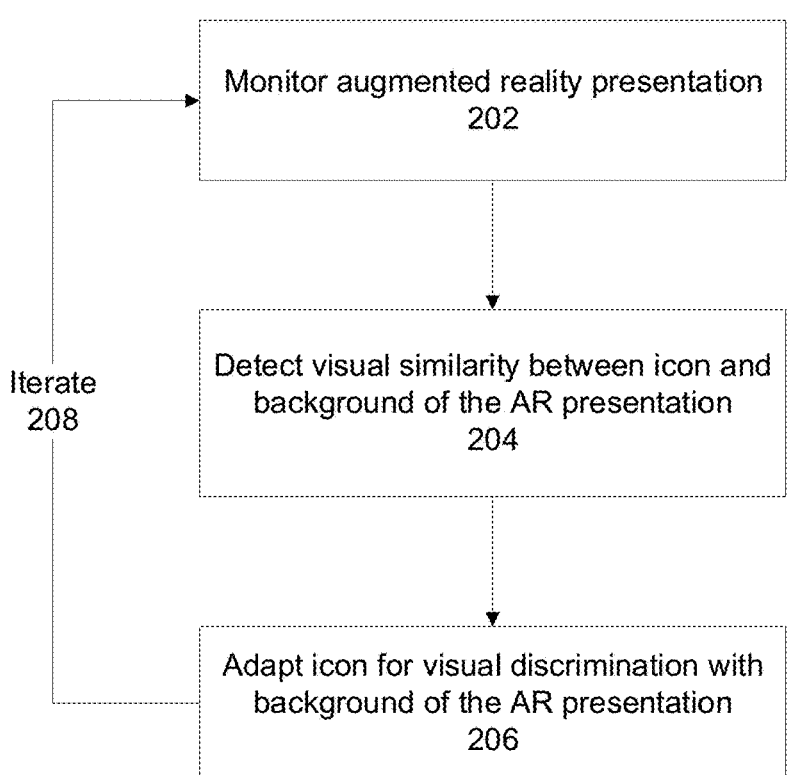
FIG. 2 is a flowchart of a method of dynamic adaptation of an augmented reality presentation for visual discrimination between an icon overlay of the AR presentation and background of the AR presentation, in accordance with some embodiments of the present disclosure.

Reference is now made to FIG. 1, which is a block diagram of a system 100 for dynamic adaptation of an augmented reality presentation for visual discrimination between an icon overlay of the AR presentation and background of the AR presentation, in accordance with some embodiments of the present disclosure. Reference is also made to FIG. 2, which is a flowchart of a method of dynamic adaptation of an augmented reality presentation for visual discrimination between an icon overlay of the AR presentation and background of the AR presentation, in accordance with some embodiments of the present disclosure. Reference is also made to FIGS. 3A-3F, which includes schematics depicting dynamic adaptation of an augmented reality presentation for visual discrimination between an icon overlay of the AR presentation and background of the AR presentation, in accordance with some embodiments of the present disclosure.

System 100 may implement the features of the method described with reference to FIGS. 2-3, by one or more hardware processors 102 of a computing device 104 executing code instructions (e.g. code 106A) stored in a memory (also referred to as a program store) 106.

Computing device 104 may be implemented as, for example, an on-board computer integrated into a vehicle, software installed on the on-board computer, an external computer connected to the on-board computer (e.g., smartphone, connected via a wireless and/or wired connection), a client terminal, a server, a virtual machine, a virtual server, a computing cloud, a mobile device, a desktop computer, a thin client, a Smartphone, a Tablet computer, a laptop computer, a wearable computer, glasses computer, and a watch computer.

Multiple architectures of system 100 based on computing device 104 may be implemented. In a localized implementation, computing device 104 is provided per moving object (e.g., vehicle), for example, installed in the vehicle, and/or located in the vehicle. Computing device 104 receives frames from an image sensor (e.g., camera 112) which may be located on the vehicle and/or associated with the vehicle (e.g., on a helmet of a driver). Computing device 104 locally and adapts the icon (and/or generates the AR presentation with adapted icon overlay) that is presented on a user interface 124, for example, a display and/or HUD (e.g., on the windshield). In a centralized implementation, computing device 104 storing code 106A may be implemented as one or more servers (e.g., network server, web server, a computing cloud, a virtual server) that provides services (e.g., one or more of the acts described with reference to FIGS. 2-3) to one or more servers 118 and/or client terminals 108 over a network 110, for example, providing software as a service (SaaS) to the servers 118 and/or client terminal(s) 108, providing software services accessible using a software interface (e.g., application programming interface (API), software development kit (SDK)), providing an application for local download to the servers 118 and/or client terminal(s) 108, and/or providing functions using a remote access session to the servers 118 and/or client terminal(s) 108, such as through a web browser and/or viewing application. For example, images captured by image sensors 112 located on different vehicles are transmitted to computing device 104 via network 110. Computing device 104 centrally adapts the icon according to an analysis of the image.

Computing device 104 may centrally create the AR presentation with adapted icon. The adapted icon (and/or AR presentation) is provided to each respective client terminal 108 and/or server 118 for local presentation on a display and/or HUD.

Image sensor 112 may be, for example, a camera, such as a video camera. Image sensor 112 may be a color sensor. Image sensor 112 may be a visible light based sensor, for example, a red-green-blue (RGB) sensor such as CCD and/or CMOS sensors. It is noted that other image sensors 112 may be used, for example, thermal sensors (e.g., infrared sensor). Sensor(s) 112 may transmit captured images to computing device 104, for example, via a direct connected (e.g., local bus and/or cable connection and/or short range wireless connection), and/or via a network 110 and a network interface 122 of computing device 104 (e.g., where sensors 112 are connected via internet of things (IoT) technology and/or are located remotely from the computing device).

Network interface 122 may be implemented as, for example, a local vehicle network, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 106 stores code instructions executable by hardware processor(s) 102. Exemplary memories 106 include a random access memory (RAM), read-only memory (ROM), a storage device, non-volatile memory, magnetic media, semiconductor memory devices, hard drive, removable storage, and optical media (e.g., DVD, CD-ROM). For example, memory 106 may store code 106A that execute one or more acts of the method described with reference to FIGS. 2-3.

Computing device 104 may include data storage device 120 for storing data, for example, applications that provide data used to generate the icon overlay (e.g., navigation system, ADAS system), and/or an icon dataset 120B that includes different icons that may be selected (e.g., right arrow, left arrow, tag, hazard sign, emergency sign, and the like). Data storage device 120 may be implemented as, for example, a memory, a local hard-drive, a removable storage unit, an optical disk, a storage device, a virtual memory and/or as a remote server 118 and/or computing cloud (e.g., accessed over network 110). It is noted that apps 102A and/or icon dataset 120B may be stored in data storage device 120, for example, with executing portions loaded into memory 106 for execution by processor(s) 102.

Computing device 104 and/or client terminal(s) 108 and/or server(s) 118 include and/or are in communication with one or more physical user interfaces 124 designed to present the AR presentation, for example, a display, AR glasses, and a HUD such as a windshield of the car.

Alternatively or additionally, user interface 124 may include a mechanism for inputting data and/or viewing other data, for example, AR settings. Exemplary other user interfaces 124 include, for example, one or more of, a touchscreen, a display, a keyboard, a mouse, and voice activated software using speakers and microphone.

Referring now back to FIG. 2, at 202, an augmented reality presentation is monitored. The AR presentation is based on frames of a video captured by a camera (and/or other imaging sensor that captures images). The camera is located on a moving object, for example, a car, a truck, a plane, a drone, an autonomous vehicle. The camera may be located on a user that is located on a moving object, for example, on a helmet of a user driving a motorcycle, scooter, and a dune buggy.

The AR presentation depicts an icon overlay. The icon may be an overlay on frames of the video captured by the camera. Alternatively or additionally, the icon may be an overlay on a HUD, for example, a windshield of the vehicle. In such implementation, the rest of the HUD is clear, providing a view of the environment and/or scene up ahead, with the icon positioned accordingly on the HUD relative to real world objects. The location of the icon on the HUD may be determined, for example, by an analysis of the images, which may be correlated to the real world environment behind the HUD.

It is noted that for simplicity and clarity of explanation, a single icon is described. However the approaches described herein may be implemented for multiple icons, for example, independent for each icon.

The icon may be associated with real world objects depicted in the image. For example, tags of points of interest, such as gas station, park, museum, and the like.

The icon may indicate actions for the user to perform, for example, indicating to the user where to navigate the vehicle, such as an arrow to turn right, and arrow indicating to take the third exit at the roundabout, and the like. The icon may be rendered, for example, based on a navigation system.

The icon may warn the user of upcoming hazards and/or other upcoming traffic related incidents, for example, traffic jam ahead, stopped car on side of the road, hole in road, accident, pedestrian crossing, motorcycle/bicycle passing, and police hiding. The icon may be rendered based on an advanced driver assistance system (ADAS).

Exemplary icons include an arrow indicating where to direct the vehicle, a tag indicating a possible hazard, a tag indicating presence of police (e.g., hiding to catch speeders), and a tag indicating a location of interest (e.g. for stopping).

At 204, a visual similarity between the icon and the background of the AR presentation is detected.

The visual similarity may be between pixels of the icon and pixels of a specific frame (e.g., each current frame received in real time, and/or every several frames over a time interval), optionally pixels of the frame behind the icon and/or in near proximity to the icon.

The visual similarity may be, for example, between an average value of the pixels of the icon and an average value of the pixels (or pixels of an image) of the background. The visual similarity may be, for example, between a distribution of values of the pixels of the icon and a distribution of the pixels (or pixels of an image) of the background. The visual similarity may be, for example, between an average value and/or distribution of a group and/or sample of the pixels of the icon and an average value and/or distribution of a group and/or sample of the pixels (or pixels of an image) of the background.

Alternatively or additionally, in the case of the icon presented on a HUD, the visual similarity may be between pixels of the icon and real world environment/objects located behind the icon and/or in near proximity to the icon.

The region (e.g. pixels and/or real world environment) in near proximity to the icon may include pixels and/or an unobstructed view of the real world that extends out from a border of the icon. The region extends in a dimension sized for visual discrimination between pixels and/or the real world region in the unobstructed view and pixels the icon. The visual discrimination is in view of pixels external to the dimension (i.e., the region) and/or the real world environment externally to the dimension (i.e., the region). For example, the thickness of the region extending around the border of the icon may be, for example about 5 millimeters (mm), or 1 centimeter (cm) and/or pixel equivalents of the dimension. The 5 mm or 1 cm or other size provides a contrast between the background and the region, and between the region and the icon, enabling quick identification of the icon relative to the background even when the icon and the background are the same color and/or intensity. For example, when both the icon is blue and the background sky is blue, a region colored red around the border of the icon may visually distinguish the blue icon from the blue sky.

Optionally, the visual similarity is computed as a statistical distance. The statistical distance may be computed within a single or multi-dimensional color and/or intensity space. The statistical distance may be, for example, a Euclidean distance within the space. Exemplary spaces include: an intensity space (e.g., single dimension of intensity, and/or multi dimensional intensity such as 3 intensities for 3 colored pixels), a color space (e.g. red, green, blue (RGB)), and a combined intensity-color space. For example, the statistical distance is computed within the single or multi-dimensional color and/or intensity space, between a point(s) in the space representing pixel(s) of the icon and point(s) in the space representing background (e.g., pixel(s) of the specific frame) behind the icon and/or in near proximity to the icon.

At 206, the icon is adapted for visual discrimination between the icon and background (e.g., pixels of the specific frame and/or real world environment and/or real world objects) behind the icon and/or in near proximity to the icon.

The icon is adapted in response to the detected visual similarity.

Optionally, the icon is adapted for visual discrimination when the statistical distance is above a threshold. The threshold may be, for example, a preset value, and/or a dynamically determined value such as depending on where the statistical distance is computed within the color space.

The icon may be adapted by adjusting intensity and/or color of the pixels of the icon, such that the new statistical distance computed for the adjusted pixels of the icon is above the threshold.

One or more parameters of the icon, optionally in combination, may be adjusted, for example:

Color within the icon. Different colors may be visually discriminated, for example different colors based on different prime colors may be visually discriminated, while different colors based on the same prime color may be visually similar.

Intensity of pixels within the icon. Values on opposites of the intensity spectrum (e.g., dimension) may be visually discriminated. For example, a bright arrow on a dark background (e.g., night, tunnel) may be visually discriminated, while similar intensities may be visually similar such as a bright arrow on a bright background (e.g., sun, bright road lights).

Border of the icon. The border itself may be adjusted, for example, thickness of the border, intensity of pixels of the border, and/or color of the border. The border may be visually discriminated, such as even when the interior of the icon and the near background are of same/similar intensity and/or color.

Pattern within the icon. A pattern of changing pixel intensity and/or color may be better visually discriminated in comparison to a solid value of pixel intensity and/or color. For example, dots, dashed lines, and/or waves may improve visual discrimination.

Shape of the icon. Certain shapes may be better visually discriminated against the background. For example, for a background of horizontal lines, circles may be better visually discriminated.

Alternatively or additionally, the icon is adapted by moving the icon from a present location (i.e., where the icon is visual similar to the proximal background) to another location on the augmented reality presentation where the icon is visual discriminated relative to the proximal background. For example, a blue arrow pointing right appearing in the upper portion of the AR presentation against a blue sky is visually similar to the sky. The blue arrow may be moved to a lower portion of the screen against a brown and/or green background of plants and/or ground, where the blue arrow is visually discriminated relative to the brown and/or green background. It is noted that the movement of the icon is to be consistent with the meaning and/or intension of the icon (e.g., as provided by the navigation system and/or ADAS system).

Optionally, the adaptation is based according to a color blind profile of a user viewing the augmented reality presentation. The color blind profile may be, for example, selected by the user from different color blind profiles, and/or saved as a preset parameter. The visual similarity and visual discrimination, optionally the statistical distance and/or color space used to determine the statistical distance, may be determined according to the color blind profile. For example, for a person with total color blindness, no colors are adapted, rather, intensity and/or shape of the icon may be adapted. In another example, for a person with red-green color blindness, the red-green color axis in the color space may be eliminated and/or defined as of no significant distance. Adaptation of the icon for increased statistical distance may be along the blue-yellow axis.

At 208, one or more features described with reference to 202-206 may be dynamically iterated, for example, during a drive. Each captured frame, or a sample frame over a time interval (e.g., every $5^{th}$, or $10^{th}$ frame) may be processed using features 202-206.

Optionally, during the iterations, a location for the overlay of the icon on the background (e.g., specific frame) is selected. Initial values for pixels of the icon are selected for visual discrimination between the icon at the selected location and the background (e.g., pixels of the specific frame and/or real world environment and/or real world objects) behind the icon at the location and/or in near proximity to the icon at the location. The selected pixels of the icon at the selected location may then be processed using features 202-206, to monitor whether the icon of the selected pixels and the selected location maintains visual discrimination or has become visually similar to the background. When the icon of the selected pixels and the selected location has become visually similar to the background, the icon may be adjusted to provide visual discrimination, for example, by adjusting pixel color and/or intensity and/or location of the icon, as described herein.

Figure 3A:
FIGS. 3A-3F includes schematics depicting dynamic adaptation of an augmented reality presentation for visual discrimination between an icon overlay of the AR presentation and background of the AR presentation, in accordance with some embodiments of the present disclosure.
Figure 3B:
Figure 3C:
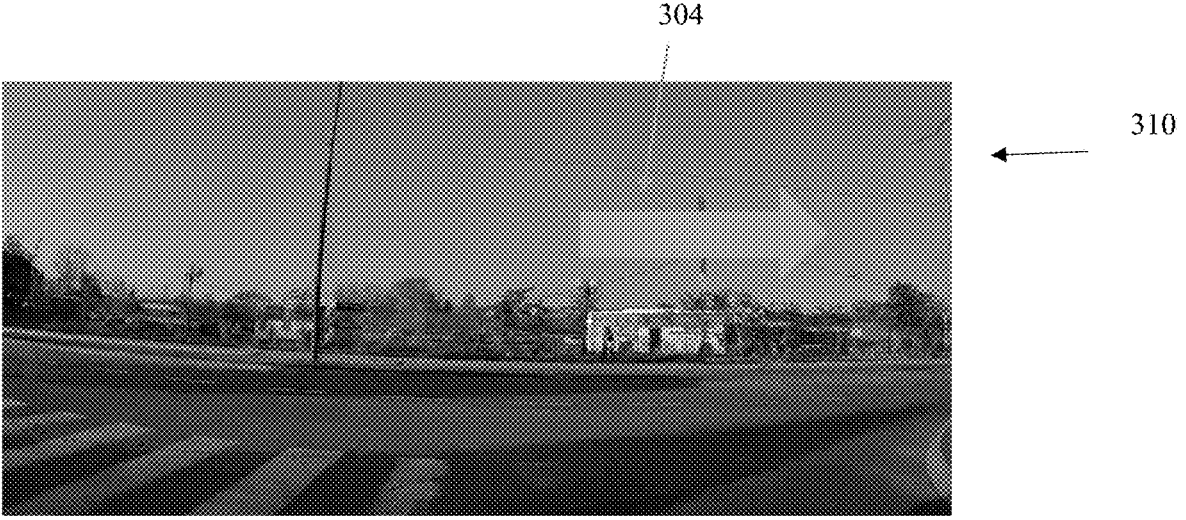
Figure 3D:
Figure 3E:
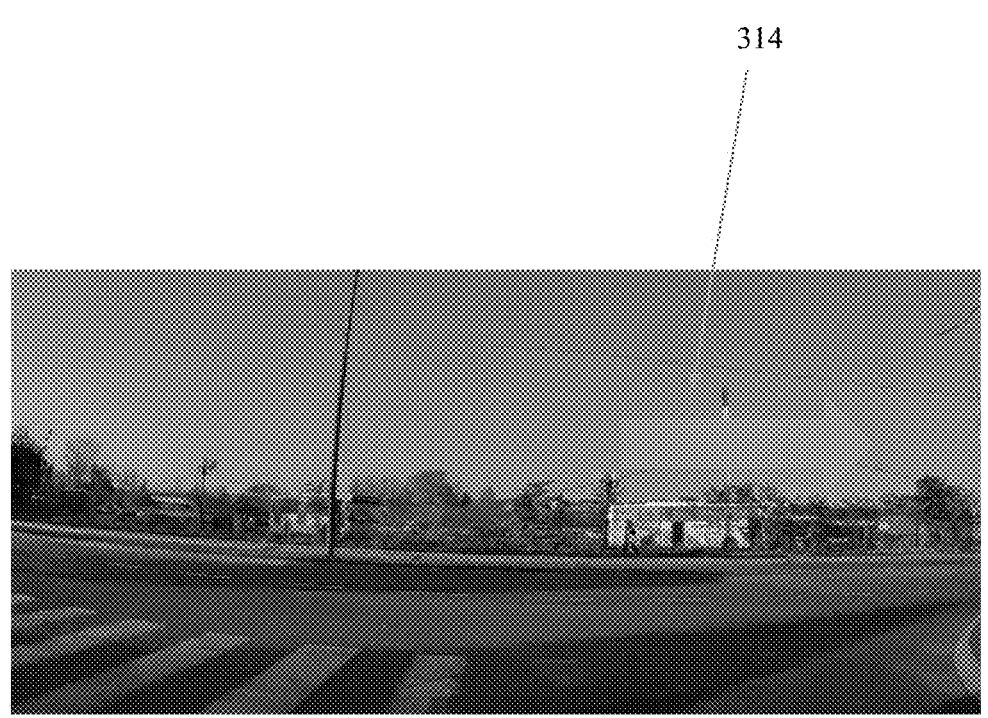
Figure 3F:

Referring now to FIGS. 3A-3F, FIG. 3A depicts a raw image of a frame 300 captured by a camera on a car. It is noted that the background is overall dark. FIG. 3B depicts an AR 302 presentation that includes frame 300 and an icon 304. Icon 304 is shown as an arrow and may include text indicating "Turn Right". Icon 304 may be generated, for example, by a navigation application. Icon 304 has a color and/or intensity and/or shape and/or is placed at a location selected to provide visual discrimination relative to the dark background of frame 300. It is noted that icon 304 may be presented on a HUD as AR presentation 302, where the background is the real world scenery as seen through the HUD. Now, in FIG. 3C, AR presentation 310 is depicted, where icon 304 is maintained, but the background has now changed to become brighter, for example, the sun rose and night as in FIG. 3B has turned to day. Icon 304 of the color and/or intensity and/or shape and/or is placed at a location selected to provide visual discrimination relative to the dark background as shown in FIG. 3A-3B is now visually similar to the sky background of AR presentation 310 of FIG. 3C. FIG. 3D depicts icon 312 which is an adaption of icon 304 of FIG. 3C, to provide visual discrimination relative to the bright sky blue background. Icon 312 is created by making the interior of icon 304 clear, and changing the boundary of icon 304 to a color that is different than the background, for example orange. FIG. 3E depicts icon 314, which is another example of an adaption of icon 304 of FIG. 3C, to provide visual discrimination relative to the bright sky blue background. Icon 314 is created by changing the color and/or intensity of icon 304 to a color and/or intensity that is different than the background, for example orange and/or bright. FIG. 3G depicts icon 316, which is yet another example of an adaption of icon 304 of FIG. 3C, to provide visual discrimination relative to the bright sky blue background. Icon 314 is created by maintain the interior of icon 304 at the same color and/or brightness, and adapting the border of icon 304 a color and/or intensity that is different than the background, for example a thick dark line.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant AR presentations will be developed and the scope of the term AR presentation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A computer implemented method of dynamic adaptation of an augmented reality presentation, comprising:

monitoring an augmented reality presentation comprising frames of a video captured by a camera disposed on a moving object, and an icon overlay on the frames;

detecting a visual similarity between pixels of an icon of the icon overlay and pixels of a specific frame at least one of: behind the icon and in near proximity to the icon;

in response to the detected visual similarity, adapting the icon for visual discrimination between the icon and pixels of the specific frame at least one of: behind the icon and in near proximity to the icon;

computing a statistical distance between pixel intensities of the pixels of the icon and pixels of the specific frame at least one of: behind the icon and in near proximity to the icon; and adapting the icon for visual discrimination when the statistical distance is above a statistical distance threshold by adjusting intensity of pixels of the icon to above a pixel intensity threshold.

2. The computer implemented method of claim 1, wherein the moving object comprises a vehicle, and the icon is generated by a navigation system.

3. The computer implemented method of claim 2, wherein the icon is selected from a group consisting of: an arrow indicating where to direct the vehicle, a tag indicating a possible hazard, a tag indicating police, and a tag indicating a stop location of interest.

4. The computer implemented method of claim 1, wherein the moving object comprises a vehicle, and the icon is generated by an advanced driver assistance system (ADAS).

5. The computer implemented method of claim 1, wherein the augmented reality presentation is presented on a head up display (HUD), wherein the icon is rendered as the icon overlay on the head up display relative to real world objects appearing in a scene behind the HUD, and the visual similarity is detected between pixels of the icon and real world regions of the environment and/or objects located at least one of: behind the icon and in near proximity to the icon.

6. The computer implemented method of claim 1, wherein the adapting the icon comprises adapting a member selected from a group consisting of: color within the icon, intensity of pixels within the icon, border of the icon, intensity of pixels of the border of the icon, pattern within the icon, thickness of the border of the icon, and shape of the icon.

7. The computer implemented method of claim 1, wherein the adapting the icon comprises moving the icon from a present location of visual similarity to another location on the augmented reality presentation of visual discrimination.

8. The computer implemented method of claim 1, further comprising:

computing a statistical distance within a color space between color of the pixels of the icon and color of pixels of the specific frame at least one of: behind the icon and in near proximity to the icon; and adapting the icon for visual discrimination when the statistical distance is above a statistical distance threshold by adjusting color of pixels of the icon to above a pixel intensity threshold.

9. The computer implemented method of claim 1, further comprising:

computing a statistical distance within a multi-dimensional color-intensity space between a combination of intensity and color of the pixels of the icon and a combination of intensity and color of pixels of the specific frame at least one of: behind the icon and in near proximity to the icon; and adapting the icon for visual discrimination when the statistical distance is above a statistical distance threshold by adjusting color of pixels of the icon to above a pixel intensity threshold.

10. The computer implemented method of claim 1, wherein the adapting the icon comprises adapting color of pixels of the icon for visual discrimination according to a color blind profile of a user viewing the augmented reality presentation, wherein the visual similarity and visual discrimination are determined according to the color blind profile.

11. The computer implemented method of claim 1, further comprising iterating the monitoring, the detecting, and the adapting.

12. The computer implemented method of claim 1, wherein pixels in near proximity to the icon comprise pixels extending out from a border of the icon in a dimension sized for visual discrimination between pixels in the dimension and pixels of the icon in view of pixels external to the dimension.

13. The computer implemented method of claim 1, further comprising selecting a location for the overlay of the icon on the specific frame, and selecting initial values for pixels of the icon for visual discrimination between the icon at the location and pixels of the specific frame at least one of: behind the icon at the location and in near proximity to the icon at the location.

14. A computer implemented method of dynamic adaptation of an augmented reality presentation, comprising:

monitoring an augmented reality presentation presented on a heads up display (HUD), and an icon overlay on the HUD;

detecting a visual similarity between pixels of an icon of the icon overlay and a background of real world environment and/or objects located at least one of: behind the icon and in near proximity to the icon;

in response to the detected visual similarity, adapting the icon for visual discrimination between the icon and the background of real world environment and/or objects located at least one of: behind the icon and in near proximity to the icon;

computing a statistical distance between pixel intensities of the pixels of the icon and pixels of the specific frame at least one of: behind the icon and in near proximity to the icon; and adapting the icon for visual discrimination when the statistical distance is above a statistical distance threshold by adjusting intensity of pixels of the icon to above a pixel intensity threshold.

15. A computer implemented method of dynamic adaptation of an augmented reality presentation, comprising:

monitoring an augmented reality presentation comprising an icon overlay;

detecting a visual similarity between pixels of an icon of the icon overlay and a background of the augmented reality presentation located at least one of: behind the icon and in near proximity to the icon;

in response to the detected visual similarity, adapting the icon for visual discrimination between the icon and the background of the augmented reality presentation located at least one of: behind the icon and in near proximity to the icon;

computing a statistical distance between pixel intensities of the pixels of the icon and pixels of the specific frame at least one of: behind the icon and in near proximity to the icon; and adapting the icon for visual discrimination when the statistical distance is above a statistical distance threshold by adjusting intensity of pixels of the icon to above a pixel intensity threshold.

* * * * *